United States Patent Office
3,293,275
Patented Dec. 20, 1966

3,293,275
METHODS OF PREPARING ORGANO-
METALLIC COMPOUND
Richard J. Pratt, Menomonee Falls, Wis., assignor to Allis-
Chalmers Manufacturing Company, Milwaukee, Wis.
No Drawing. Filed July 16, 1963, Ser. No. 295,513
4 Claims. (Cl. 260—448.2)

This invention relates to alpha silyl esters. More particularly, this invention relates to a novel method of producing alpha silyl esters from alpha haloesters, and to certain novel products produced thereby.

The alpha silyl esters, as herein understood, are a class of organo-metalloidal compounds characterized by having a silicon atom bonded to the carbon positioned alpha to the carbonyl group. They may be represented by the structural formula,

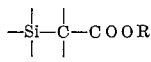

in which the indicated bonds on the silicon atom are satisfied by carbon to silicon bonds; the bonds on the alpha carbon are satisfied by either hydrogen to carbon or carbon to carbon bonds; and R represents an aryl or a cyclic or acyclic, saturated or unsaturated, substituted or unsubstituted, alkyl group.

Certain silyl esters have been heretofore produced. For example, the beta silyl esters have been prepared by Petrov et al., Zhur. Obschei, Kim 29, 2936 (1959), by the reaction of a trialkyl silane with an alpha-beta unsaturated ester. In addition, L. H. Sommer in British Patent 684,310 discloses that silyl esters, other than the alpha ester, can be prepared through the reaction of a halogeno-alkylsilane with sodiomalonic ester to produce silyl esters of the type $R_3SiC_mH_{2m}CR'(COOC_2H_5)_2$ where $m$ is an integer from 1 through 17, R is an alkyl, monocyclic aryl, or silico-neopentyl radical, and R' is hydrogen or an alkyl radical. In one example, Sommer reports the decarboxylation of the malonic ester to form ethyl beta trimethylsilylpropionate. These methods are specific for beta or higher silyl esters; however, alpha silyl esters cannot be produced thereby.

In the production of silyl esters, a great deal of difficulty has been experienced in introducing silicon into attachment to the alpha carbon atom. The following summary includes the few known attempts reported as successful in obtaining an alpha silyl ester.

Sommer reports at J.A.C.S. 70, 2874 (1948) and J.A.C.S. 71, 1509 (1949) the preparation of alpha trimethylsilyl ester from the reaction of tetramethylsilyl Grignard with ethylchloroformate.

$(CH_3)_3SiCH_2MgCl + ClCOOC_2H_5 \rightarrow$
$((CH_3)_3SiCH_2COOC_2H_5)$

While this is an excellent preparative technique for the disclosed silyl ester, the method is severely limited by the difficulty of procuring suitable Grignard reagents. For example, to prepare an alpha silyl ester such as ethyl alpha diphenylvinylsilylpropionate

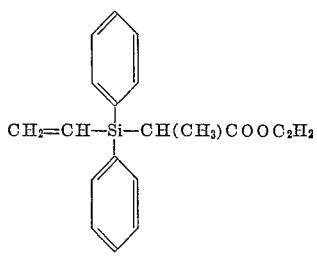

would require a Grignard having the structure

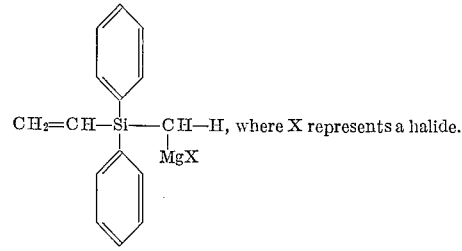

$CH_2=CH-Si-CH-H$, where X represents a halide.

The preparation of this Grignard in an appreciable yield would be difficult, and its preparation as far as is known has not been reported.

A further report in the literature is that of C. R. Hance et al., J.A.C.S. 75, 994 (1953) wherein the preparation of ethyl trimethylsilylacetate and ethyl alpha trimethylsilylisobutyrate is disclosed. The method first requires the preparation of the sodioderivative of either ethyl acetate or ethyl isobutyrate with sodium triphenylmethide. While sodioderivatives are extremely reactive and the sodioderivatives of these esters often undergo self-condensation, Hance has found that ethyl sodioacetate and ethyl alpha sodioisobutyrate can be reacted with trimethylchlorosilane to form the respective trimethylsilylesters.

From the above discussion, it is apparent that no general preparative method exists to produce alpha silyl esters. Also apparent is the fact that the existent methods are cumbersome, and apply to only a few specific silyl esters. As far as is known, only ethyl alpha trimethylsilylacetate and ethyl alpha trimethylsilylisobutyrate have been produced.

Accordingly, it is one general object of my invention to provide a method which eliminates the disadvantages attending prior art methods. It is an additional object of my invention to provide a method for producing a diversity of alpha silyl esters, the majority of which have heretofore been unknown.

A still further object of my invention is to provide a commercially suitable method for producing alpha silyl esters.

Another object of my invention is to provide a method for producing alpha silyl esters in a number of steps less than has been possible with prior art methods.

An additional object of my invention is to provide a method for producing alpha silyl esters having organic radicals present on the carbon atom alpha to the carbonyl group.

A still further object of my invention is to produce alpha silyl esters having a chlorinated hydrocarbon bonded to the silicon through carbon-silicon bonding.

Another object of my invention is to produce alpha silyl esters having vinyl group bonded to the silicon.

The method which I have discovered meets the foregoing objects in a remarkably unexpected fashion. As I should like to present my invention with the greatest possible clarity, I shall first discuss the alpha haloesters. Following this, I shall discuss the Reformatsky reaction. Then I shall shall set forth those trisubstituted chlorosilanes suitable for use with my method. I shall then detail the method itself, followed by a discussion of the products obtained thereby.

*Alpha haloesters*

It is, of course, elementary that an organic ester is a derivative of a carboxylic acid or a polycarboxylic acid in which the carboxylate hydrogens have been replaced by either cyclic or acylic, saturated or unsaturated alkyl groups. Substitution of a halogen on the carbon alpha to the carbonyl carbon results in an alpha haloester.

Within this specification, the term haloesters is meant to include only the iodo, the chloro, and the bromo esters. Chloro and bromo alpha haloesters may be produced by the direct halogenation of the acid catalyzed by a small amount of phosphorus trihalide as in the Hell-Volhard-Zelinsky reaction.

The halogenated acid may then be refluxed with an alcohol to produce the alpha haloester. Because of favorable equilibrium and boiling range, the ethyl ester is easily produced and commercially available.

The Reformatsky reaction

The reaction of magnesium with an alpha haloester to form the corresponding Grignard reagent has consistently failed because any Grignard formed I
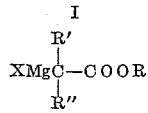

immediately undergoes condensation with haloester to form

II
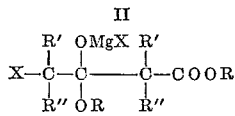

In the above Formulas, I and II, X is understood to represent a halogen, R represents a lower alkyl radical, and R' and R" represent identical or different radicals selected from the group comprising R, or hydrogen.

The well known Reformatsky reaction teaches the substitution of zinc for magnesium. In this reaction a ketone or aldehyde is reacted with the alpha haloester in the presence of zinc and usually a small amount of iodine.

III
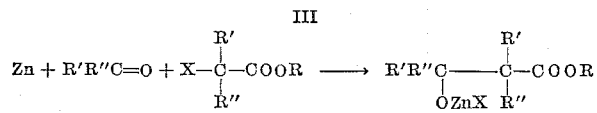

where X, R, R' and R", for example, have the same meaning as in Formulas I and II. Hydrolysis of Compound III will liberate the beta hydroxy ester. The alpha iodo esters, although generally more reactive in the Reformatsky reaction than either the bromo esters or the chloro esters, are, however, not readily available. The chloroacetic esters are less reactive than the bromo or the iodo acetic esters. The reactivity of the chloro esters increases somewhat in esters containing secondary or tertiary chlorine atom. It is reported that the reactivity of chloro esters can be improved by the use of a zinc copper couple rather than zinc alone. Therefore, because of their availability, the ethyl bromo esters will be considered exemplary of alpha haloesters throughout this specification.

The reaction is thought to proceed through several steps. The first step forms a compound analogous to a Grignard reagent.

(1)
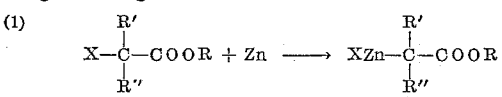

wherein X, R, R', and R" have the same meaning as before. It has uniformly been taught that this intermediate

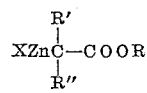

was unstable and would, like the Grignard reagent, undergo condensation. For this reason it was taught as necessary in the practice of the Reformatsky reaction to prepare the organozinc compound in the presence of the ketone or aldehyde. This was done because the intermediate was said to react preferentially with the ketone or aldehyde and thus repress formation of condensation product. The second step is then:

(2)
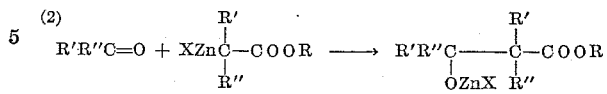

followed by hydrolysis in the third step;

(3)
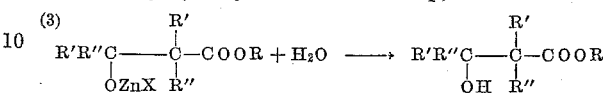

Surprisingly, I have found that the intermediate

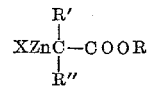

is sufficiently resistant to condensation to enable its formation followed by the subsequent addition of trialkylchlorosilane without undue loss of intermediate.

Trialkyl chlorosilanes

The reaction of silicon with chlorine will produce tetrachlorosilane, $SiCl_4$. Reaction of tetrachlorosilane with Grignard reagent will produce, under controlled conditions, trialkylsilane. Other methods of producing substituted chlorosilanes such as passing alkyl halides over a silicon containing catalyst are known. Chlorosilanes as used in this specification denote those compounds having the general structural formula

where R, R', and R" represent identical or different constituents selected from the group comprising the lower cyclic and acyclic, substituted and unsubstituted, saturated and unsaturated lower alkyl radicals, the aryl radicals, and the naphthyl radicals. Those chlorosilanes that I have found particularly useful are trimethyl; dimethyl chloromethyl; diphenyl vinyl and triphenyl. Other known alkyl and alkyl aryl chlorosilanes such as the triethyl; trinaphthyl; and phenyl-methyl vinyl should prove suitable.

Method

In the practice of my invention the first step comprises reaction of an alpha haloester, most preferably the alpha bromo ester, with zinc to form a Reformatsky intermediate.

$Zn + R'R''CXCOOR \rightarrow R'R''CZnXCOOR$ where R, R', R" and X have the meanings assigned in Formulas I and II. While many of the alpha haloesters are liquids, it is advisable to include a solvent to moderate the reaction and reduce by-product formation. The solvent chosen should be one which will maintain a homogeneous phase between reactants and products. I have found diethylether suitable, but other commonly used solvents such as tetrahydrofuran, dioxane, methylal and the like should prove satisfactory.

As in the Reformatsky reaction, the zinc must be clean and free of oxide film. The customary method of obtaining clean zinc is to wash finely divided zinc with hydrochloric acid until hydrogen freely evolves. The zinc is then washed free of acid and rinsed thoroughly with clean water. The zinc must then be dried since water is deleterious to the reaction.

The addition of the alpha haloester to the zinc must be done under anhydrous conditions. This can most advantageously be accomplished by maintaining a dry inert atmosphere over the reactants. I prefer a nitrogen blanket, but any inert gas such as helium, hydrogen and the like can be substituted for nitrogen.

After the alpha haloester has been added to the zinc, the reaction mixture is mildly refluxed at a temperature of from 30° to 50° C., depending on the solvent, until reaction is complete. A crystal or two of iodine may be initially added to promote the reaction. Once started, the reaction proceeds to completion. Where the solvent is diethylether the refluxing will take place somewhat above the boiling point of ether (34.6° C.). In the case of less reactive haloesters, such as the chloro esters, the choice of a higher boiling solvent will permit refluxing at higher temperatures. However, reaction at the higher temperatures will lead to increased side reactions such as coupling of the haloester and condensation of the haloester with zinc haloester. With the less reactive chloro esters, the use of a zinc copper couple or other known techniques to catalyze the Reformatsky reaction are apparent. The formation of the colored product characteristic of many organometallics is a signal that the reaction is proceeding satisfactorily. The intermediates are usually grey or blue, although greens and yellows are sometimes encountered.

After the reaction has progressed 30 or 40 minutes, an aliquot portion of the homogeneous reaction mixture is withdrawn and analyzed for alpha halozinc ester.

The analytical method I have devised entails the titration of the alpha halozinc with standardized iodine. It is important that the analytical operation is carried out without the sample or the reaction mixture contacting moisture. The aliquot is discharged into a solvent, preferably the same solvent used in the reaction. Increments of standard iodine are then run into the sample until the iodine color persists. The iodide oxidizes the halozinc ester to alkyl iodide, and ZnXI. The number of moles of halozinc ester can be calculated from the following formula.

$$\text{moles intermediate} = \frac{(\text{ml. } I_2)(NI_2)(\text{ml. product})}{(\text{ml. aliquot})(2000 \text{ meg./mole})}$$

where ml. represents milliliters; N the normality; and meg., milliequivalents. I have determined this analytical method to be accurate in the range of $\pm 2\%$.

When subsequent titrations have confirmed that reaction is complete, the chlorosilane is added. Of course if a subsequent titration indicates additional halozinc ester, refluxing is continued until there is no further increase in titer.

To the intermediate is then added the chlorosilane. fluxing should ideally be carried out at a temperature of about 30° to 50° C. so as to minimize by-product formation. Because heating in excess of the minimum temperature required to achieve reaction results in lower yields, it is apparent that refluxing is not indicated in every preparation. Quite often heating slightly above room temperature will suffice.

I have followed the procedure of first forming the Reformatsky intermediate, and then adding the chlorosilane. The formation of alpha silyl ester may also be carried out in one step. In following a one step procedure, the alpha haloester and the chlorosilane would be admixed with clean zinc in a suitable solvent. This admixture is then mildly heated 30° to 50° C. As the zinc haloester formed, it would react with the chlorosilane. The reactants as before should be protected from moisture. This procedure is prone to result in the coupling of the chlorosilane with itself rather than with the zinc haloester. Therefore, this procedure would not be advisable when the haloester chosen reacts sluggishly with the zinc, and higher temperatures are required.

The crude product is purified, if desired, by washing free of zinc salts with successive aqueous portions of sodium chloride, ammonium hydroxide followed by a water wash. The organic phase is then collected and passed through anhydrous magnesium sulfate. The crude alpha silyl ester may then further be purified by distillation at reduced pressure.

*Products*

The alpha silyl esters generally have a pleasant odor and are suitable for use as industrial perfumants or odor masking agents. They are also useful as solvents, plasticizers, diluents and lubricant additives. Those having a vinyl group attached to silicon also may be useful as monomers.

Table I lists certain alpha silyl esters produced according to the method of my invention together with certain determined properties. Steric considerations are foreseen to be the controlling factor in whether the reaction of an alpha halozinc ester and a trialkylchlorosilane produces alpha silyl ester in satisfactory yields. Generally, the silicon atom in a trialkylchlorosilane will accommodate radicals of a bulk larger than the corresponding carbon compounds can accommodate. For example, trinaphthylchlorosilane is known.

TABLE I.—PHYSICAL PROPERTIES

| | I | II | III | IV | V | VI | VII |
|---|---|---|---|---|---|---|---|
| $n_D$ 25° C | 1.4137 | | 1.4230 | 1.4442 | 1.4295 | 1.5613 | 1.4141 |
| Boiling Point, ° C. (mm. Hg) | 65–72 (40–45) | | 54–57 (20) | 63–64 (3–4) | 63–64 (9–10) | 122–125 (0.11–0.19) | 66.5–68.5 (50) |
| Saponification Equivalent | 168 | 341 | 166.6 | 176.8 | 202.5 | 390 | |
| Analytical Results: | | | | | | | |
| Percent carbon | | 76.13 | 57.53 | 42.69 | 59.33 | 73.03 | |
| Percent hydrogen | | 6.41 | 10.69 | 7.79 | 10.96 | 6.48 | |
| Percent silicon | | 8.29 | 14.93 | 14.01 | 12.34 | 9.43 | |
| Percent chlorine | | | | 18.4 | | | |
| Infrared Absorption in Wave Number (cm.$^{-1}$): | | | | | | | |
| $-C\overset{O}{\diagup}$ | 1,725 | 1,720 | 1,720 | 1,702 | 1,710 | 1,700 | 1,700 |
| $R'\underset{R}{\overset{R''}{Si}}-$ | 855 | 1,110 | 850 | 805 | 847 | 1,130 | 846 |

The zinc attacks the chlorine atom on the chlorosilane and the silane couples with the haloester.

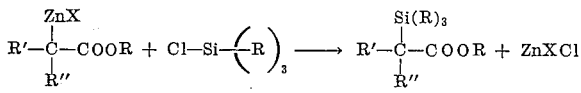

The amount of chlorosilane that will yield a maximum of silyl ester lies in the range of 80 to 120 mole percent of the alpha halozinc ester. The reaction is continued with mild refluxing for a period approximately equal to the time necessary for the intermediate to form. The re- where in the above Table I is ethyl alpha trimethylsilylacetate; II is ethyl alpha triphenylsilylacetate; III is ethyl alpha trimethylsilylbutyrate; IV is ethyl alpha dimethylchloromethylsilylacetate; V is ethyl alpha trimethylsilylisovalerate; VI is ethyl alpha diphenylvinylsilylpropionate; and VII is ethyl trimethylsilylisobutyrate.

The yield also is apparently dependent on the bulk of the groups attached to the alpha carbon of the zinchaloester. Therefore, the ethyl alpha trinaphthylsilylacetate would form more readily than the ethyl alpha trinaphylsilylisobutyrate.

The following example is illustrative of the preparation of ethyl alpha dimethylchloromethylsilylacetate.

It should be understood that in this example all materials and equipment used in this preparation were thoroughly dry and were protected from moisture. The equipment comprised a reaction flask fitted to receive a reflux condenser, a dropping funnel, a stirring device, and a nitrogen inlet. The system was vented through a mercury trap. The reaction vessel was flushed with dry nitrogen. The dropping funnel was removed and to the vessel was added 26 grams (0.40 mole) of clean zinc, 150 ml. diethylether, 13.7 grams (0.082 mole) of ethyl alpha bromoacetate and 100 to 200 mg. of iodine. The dropping funnel was then replaced. The vessel was again flushed with dry nitrogen. After about 5 to 10 minutes, the iodine color had disappeared. Stirring was started. After about 1 hour of gentle refluxing a 1 ml. aliquot was withdrawn and analyzed. This analysis showed 0.083 mole of alpha bromozincester to be present. When a second aliquot 15 minutes later showed no increase in alpha bromozincester, it was determined that the reaction had proceeded to completion. To the reaction vessel through the dropping funnel was then added 10.7 grams (0.075 mole) of dimethyl chloromethyl chlorosilane. The solution was heated to reflux gently for about 45 minutes. Then 80 ml. of water, 20 ml. 2% $NH_2OH$ and 20 ml. of saturated NaCl was successively shaken with the crude product and withdrawn. The ethereal solution was separated from the aqueous phase and dried over anhydrous magnesium sulfate and distilled.

The yield of the refined fraction distilling at 63–64° C. and 3–4 mm. of mercury was 6.0 grams (41% yield) and had a refractive index of 1.4442 at 25° C.

Table II lists data for various other silyl esters prepared by the method of my invention.

It is to be understood that changes and variations in this procedure may be made without departing from the spirit and scope of my invention as defined in the appended claims.

Having now particularly described and ascertained the nature of my said invention and the manner in which it is to be performed, I declare that what I claim is:

1. The method of producing an alpha silyl ester comprising the steps of admixing in a diethylether solvent substantially equimolar portions of zinc and an ethyl alpha halo ester selected from the group consisting of the chloro and bromo acetates, propionates, butyrates, and valerates; refluxing said admixture; periodically withdrawing and analyzing portions of the admixture to determine the progress of the reaction; when reaction is substantially complete adding from 80 to 120 mole percent of a chlorosilane selected from the group consisting of trimethylchlorosilane, triphenylchlorosilane, dimethylchloromethylchlorosilane and diphenylvinylchlorosilane; and continuing refluxing for a time substantially equivalent to the time the admixture has heretofore refluxed.

2. A method for producing an alpha silyl ester comprising dissolving an ethyl alpha halo ester selected from the group consisting of the chloro and bromo acetates, propionates, butyrates, and valerates in a solvent so as to form a homogeneous phase; reacting said alpha halo ester with zinc thereby forming an alpha halozincester; reacting said alpha halozincester with a chlorosilane selected from the group consisting of trimethylchlorosilane; triphenylchlorosilane; dimethylchloromethylchlorosilane; and diphenylvinylchlorosilane.

3. The method of claim 2 in which from 0.5 to 2.0 percent by weight of iodine, said percentage based on the weight of alpha halo ester, is added to initiate the reaction of the alpha halo ester with zinc.

4. A method for producing an alpha silyl ester comprising admixing an ethyl alpha halo ester selected from the group consisting of the chloro and bromo acetates, propionates, butyrates, and valerates with zinc, and a trialkylchlorosilane; reacting the halo ester with zinc, and reacting the resulting halozincester with the trialkylchlorosilane.

TABLE II.—PREPARATION OF SILYL ESTERS

|  | I | II | III | V | VI | VII |
|---|---|---|---|---|---|---|
| Moles bromo ester | 0.05 | 0.05 | 0.10 | 0.10 | 0.05 | 0.10 |
| Moles zinc | 0.10 | 0.40 | 0.40 | 0.40 | 0.40 | 0.40 |
| Milliliters diethylether | 80 | 110 | 150 | 150 | 150 | 200 |
| Moles intermediate halozinc ester | 0.037 | 0.037 | 0.089 | 0.092 | 0.028 | 0.067 |
| Moles chlorosilane added to intermediate | 0.037 | 0.037 | 0.09 | 0.12 | 0.047 | 0.067 |
| Grams crude product | 4.2 | 5.5 | 10.0 | 5.4 | 10.0 | 9.5 |
| Boiling point, °C. (mm. Hg) | 65–72 (40–45) | 180–200 (0.2) | 80–90 (40) | 90–110 (40) | 150–168 (0.1–0.2) | 50–75 (25) |
| Grams purified product | 4.2 | 5.5 | 7.3 | 4.7 | 2.1 | 3.8 |
| Percent yield purified product | 71 | 42 | 43 | 33 | 24 | 30 |

Note.—Roman numerals refer to the compounds enumerated in Table I.

References Cited by the Examiner

UNITED STATES PATENTS 2,775,605  12/1956  De Benneville et al. _ 260—448.2
2,823,218   2/1958  Speier et al. _____ 260—448.2
3,109,011  10/1963  Pike et al. _____ 260—448.2

OTHER REFERENCES

Andrianov et al.: "Izvest. Akad. Nauk SSSR," 1956, pp. 702–6 (51 Chem. Abstracts 1877 (1957)).

Fieser et al.: "Organic Chemistry," 3rd ed., 1956, pp. 692–3, Reinhold Pub. Corp., New York.

Hance et al.: "Jour. American Chem. Soc.," vol. 75, Feb. 20, 1953, pp. 994–5.

HELEN M. McCARTHY, *Acting Primary Examiner.*

SAMUEL H. BLECH, *Examiner.*

P. F. SHAVER, *Assistant Examiner.*